Dec. 20, 1955     O. THORESEN     2,727,402

GEAR DRIVE WITH REVERSIBLE OUTPUT SHAFT

Filed Nov. 26, 1954     2 Sheets-Sheet 1

WITNESSES
E. E. Bauer
John B. Davidson

INVENTOR
Oscar Thoresen
BY
Paul E. Friedemann
ATTORNEY

Dec. 20, 1955     O. THORESEN     2,727,402
GEAR DRIVE WITH REVERSIBLE OUTPUT SHAFT
Filed Nov. 26, 1954     2 Sheets—Sheet 2
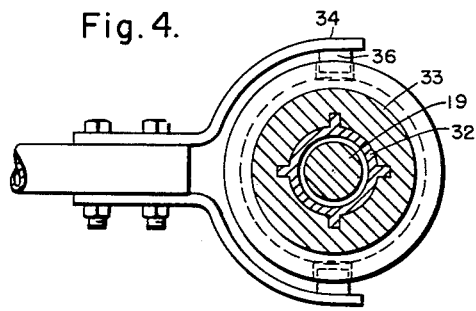
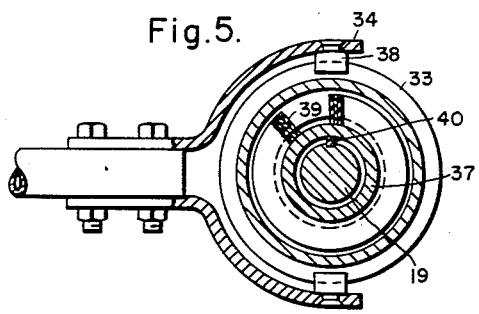
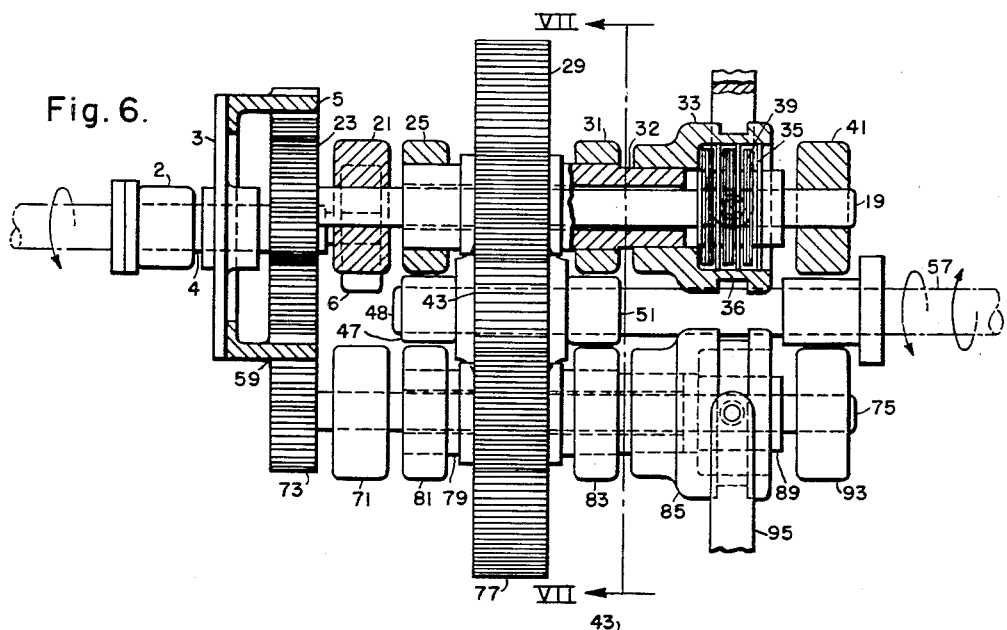
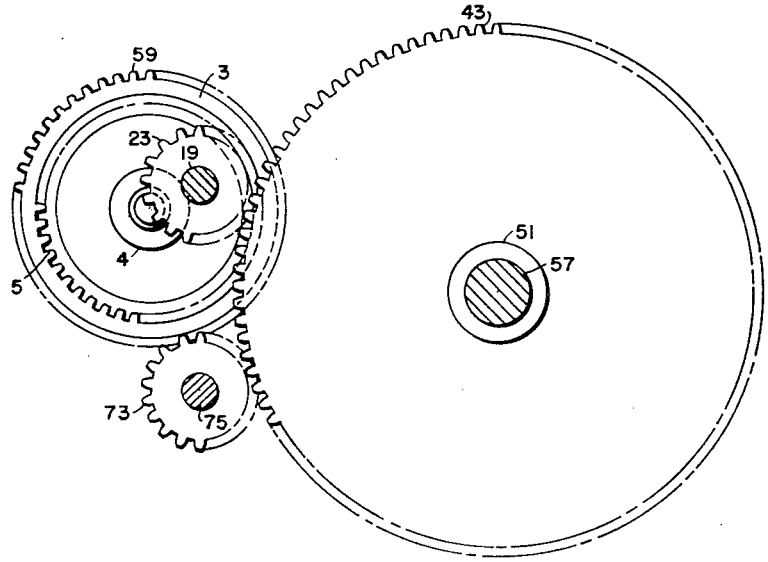

United States Patent Office 2,727,402
Patented Dec. 20, 1955

2,727,402

GEAR DRIVE WITH REVERSIBLE OUTPUT SHAFT

Oscar Thoresen, Pittsburgh, Pa., assignor to Westinghouse Electric Corporation, East Pittsburgh, Pa., a corporation of Pennsylvania Application November 26, 1954, Serial No. 471,391

5 Claims. (Cl. 74—361)

My invention relates to variable speed transmission mechanisms and, more particularly, to variable speed transmission mechanisms adapted to reverse the direction of rotation of an output shaft.

In coupling an electric motor to a driven shaft, it is often desirable to be able to reverse the direction of rotation of the driven shaft without reversing the direction of rotation of the driving motor. Such reversal should be done quickly and smoothly so as to minimize shock to the apparatus driven by the rotating shaft. The coupling apparatus should not be of large physical dimensions in order to occupy a minimum of shop floor space, and should be rugged so as to minimize maintenance and downtime of manufacturing equipment.

One object of my invention is to provide apparatus for reversing the direction of rotation of a driven shaft without stopping or slowing the operation of the electrical motor or other prime mover supplying power to the shaft.

Another object is to provide a mechanism of the above character that is rugged, easily operated and controlled, and which is not readily susceptible to damage.

Still another object is to provide a mechanism of the above character which will occupy a minimum amount of space.

Other objects and features of my invention will become apparent upon consideration of the following detailed description thereof, wherein:

Figs. 4 and 5 are sectional views of the clutching mechanism illustrated in Fig. 1, respectively taken along lines IV—IV and V—V;

Fig. 6 is a side view, partially in section, of another embodiment of my invention; and Fig. 7 is a sectional view taken along line VII—VII of Fig. 6.

Figure 1:
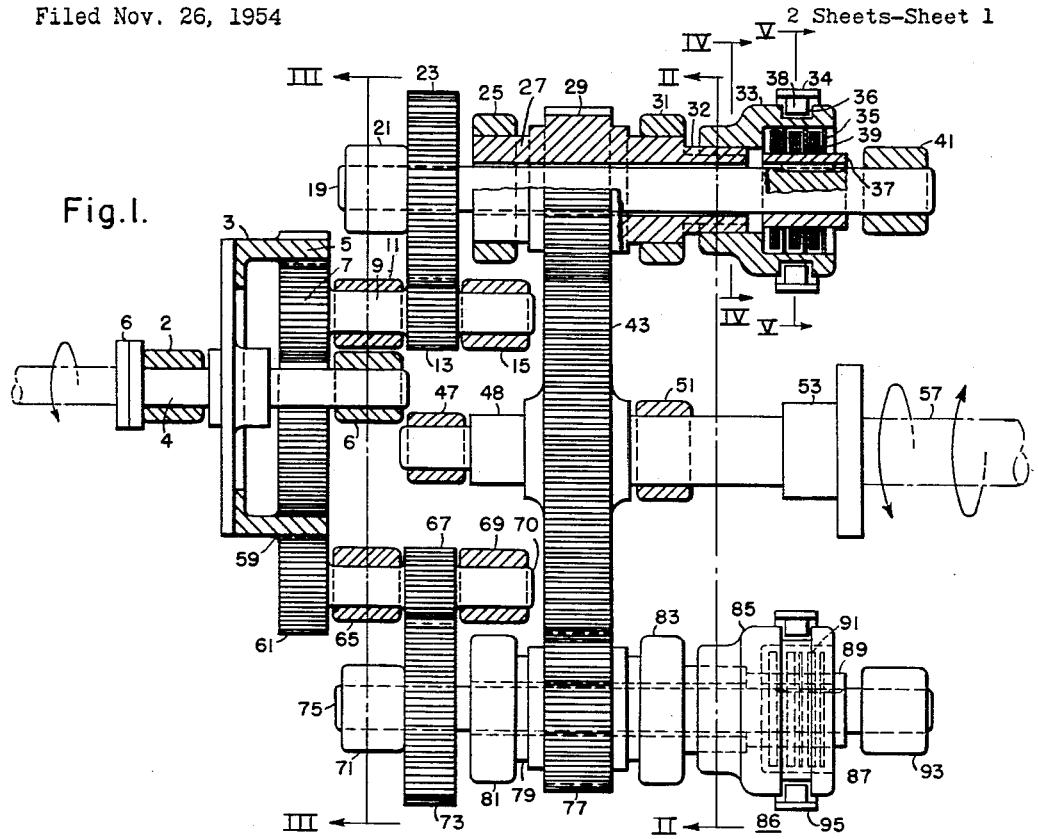
Figure 1 is a plan view, partially in section, of a preferred embodiment of my invention.

In the embodiment of my invention illustrated in Figs. 1 through 5 of the drawings, there is shown a ring gear 3 having gear teeth formed both on the internal and external surfaces thereof, connected to driven shaft 1 by means of ring gear shaft 4 and coupling flanges 6. The driven shaft 1 may be driven by an electric motor or other type of suitable prime mover such as is well known to the art. Ring gear shaft 4 may be rigidly fastened to ring gear 3 by means of a key or other suitable locking device and is journalled at the ends thereof into bearings 2 and 6.

The internal gear teeth 5 of ring gear 3 mesh with a pinion gear 7 which is affixed to a shaft 9 at one end thereof; shaft 9 is journalled into bearings 11 and 15 and intermediate therebetween has a second pinion gear 13 which meshes with the teeth of gear 23 suitably affixed to shaft 19. Shaft 19 is supported by and is journalled into bearings 21 and 41 which support the shaft at the ends thereof.

Surrounding the shaft 19 for a portion of its length is a cylindrical shaft member 27 which is journalled into bearing surfaces 25 and 31. The two shafts 19 and 27 are coupled together at the end opposite gear 23 by means of a clutch member 33 which is secured at one end thereof to shaft 27 so as to revolve therewith, but at the same time be free to move axially therealong.

As shown most perspicuously in Figures 4 and 5, clutch member 33 has a plurality of frictional clutching surfaces 35 affixed thereto in interleaving relationship with friction clutch members 39, which latter members are secured to a cylindrical sleeve 37 keyed to shaft 19 by key 40. Clutch member 33 is axially movable with respect to the shafts by means of clutch actuating mechanism 34 having a protuberance 38 engaging clutch member 33 so as to selectively engage and disengage the friction surfaces 35 and 39.

Affixed to cylindrical shaft 27 between the bearing members 25 and 31 is a pinion gear 29, the teeth of which mesh with the teeth of gear 43 affixed to shaft 48. Shaft 48 is journalled into bearing members 47 and 51 so that gear 43 is keyed to the shaft therebetween. Shaft 48 may be connected to an output shaft 57 by means of coupling device 53 or may be connected directly to the mechanism to be driven.

A second gear train similar to that described above connects the external teeth 59 of ring gear 3 to shaft 48. This gear train comprises pinion gears 61 and 67 connected respectively at one end and at the middle of shaft 70, gear 61 meshing with gear teeth 59, gear 73 meshing with pinion 67 and affixed to shaft 75, gear 77 affixed to shaft 79 and meshing with the teeth of gear 43. Shaft 75 is coupled to cylindrical shaft 79 which surrounds it for a part of its length through a clutch mechanism 86 similar to clutch mechanism 33 described above. This clutch is actuated by actuating mechanism 95 so that the friction surfaces 87, 91 thereof are engaged when the friction surfaces 35, 39 of clutch 33 are disengaged, and vice versa.

Shaft 70 is supported by bearing members 65 and 69 disposed on either side of gear 67. Likewise, shaft 75 is journalled to bearings 71 and 93 at the ends thereof and shaft 79 is supporetd by bearings 81 and 83 placed on either side of gear 77.

It is readily apparent that when clutch member 33 is engaged and clutch 85 is disengaged so as to provide an operative connection between shafts 27 and 19, assuming that driven shaft 1 is rotating clockwise, then output shaft 57 will be likewise rotating clockwise. By reversing the clutches so that clutch 86 is engaged while clutch 33 is disengaged, the direction of rotation of output shaft 57 will be reversed without reversing the direction of rotation of driven shaft 1.

Figure 2:
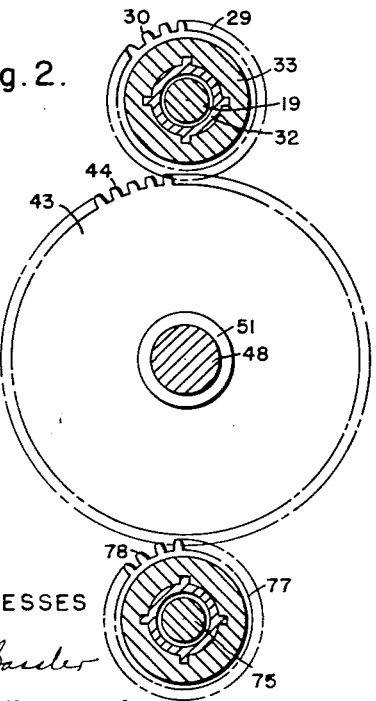
Fig. 2 is a sectional view, taken along line II—II of Fig. 1.
Figure 3:
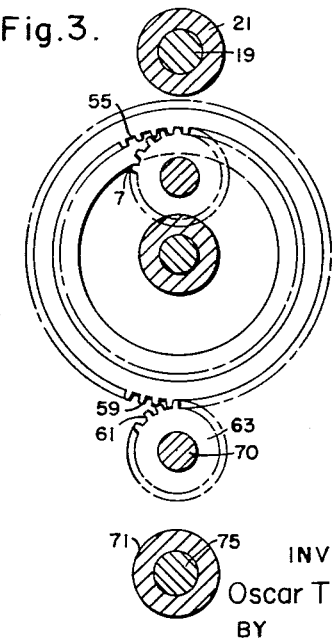
Fig. 3 is another sectional view taken along line III—III of Fig. 1.

In Figs. 6 and 7, there is shown an embodiment of my invention that is somewhat simpler than that of Fig. 1 and is adapted for high speed operation. In the embodiments of Figs. 1 and 6, identical component parts are designated by the same reference numerals. The difference between the embodiments of Figs. 1 and 7 lies in the fact that the external teeth of ring gear 79 mesh directly with the gear 73 affixed to shaft 75 and the internal teeth 5 mesh directly with the gear 23 affixed to shaft 19. Bearing 21 journalled to shaft 19 is moved inboard of gear 23, and the various parallel shafts 57, 51, 75, 79, 19 and 4 are angularly disposed with relation to each other, as shown in Fig. 7 rather than being in line as shown in Fig. 2.

Engaging clutch 33 and disengaging clutch 86 will produce an opposite direction of rotation from that resulting with the embodimnt of Fig. 1. For a clockwise rotation of driven shaft 1, there will result counterclockwise rotation about the shaft 57. Likewise, with the friction members of clutch 86 engaged and those of clutch 33 disengaged, there will result clockwise rotation of the output shaft for a clockwise rotation of the input shaft.

That the objects set forth above have been achieved by my invention is readily apparent. Inasmuch as the operator is required only to engage and disengage a pair of friction clutches, there is practically no possibility of the mechanism being serious damaged. When it is desired to reverse the direction of rotation, the friction clutch through which power is to be transmitted serves as a braking mechanism to bring the output shaft 57 to a rapid stop and accelerate it in the opposite direction of rotation. The use of cylindrical shafts surrounding and coupled to solid inner shafts by friction clutches provides a very compact device occupying a minimum amount of space and yet provides a mechanism capable of transmitting considerable power.

It is to be understood that the above is descriptive and illustrative of preferred embodiments of the invention and that various modifications can be made in the construction and arrangement of parts without departure from the spirit of the invention.

I claim as my invention:

1. A variable speed transmission mechanism comprising: a power actuated shaft, a ring gear affixed to said shaft and having gear teeth on both the inner and outer surfaces thereof, a second shaft, a gear train meshing with the gear teeth on the outer surface of said ring gear operative to drive said second shaft so as to rotate said second shaft in the same sense as said power actuated shaft, a third shaft coaxial with said second shaft and selectively coupled thereto by an externally actuated first clutch, a first pinion gear affixed to said third shaft, a fourth shaft, a gear train meshing with the internal gear teeth of said ring gear operative to drive said fourth shaft so as to rotate said fourth shaft in the opposite sense to said power actuated shaft, a fifth shaft coaxial with said fourth shaft and selectively coupled thereto by an externally actuated second clutch, a second pinion gear affixed to said fifth shaft, a sixth shaft having a gear affixed thereto meshing with both said first pinion gear and said second pinion gear.

2. A variable speed transmission mechanism comprising: a power actuated shaft, a ring gear affixed to said shaft and having gear teeth on both the inner and outer surfaces thereof, a second shaft, a gear train meshing with the gear teeth on the outer surface of said ring gear operative to drive said second shaft so as to rotate said second shaft in the same sense as said power actuated shaft, a third shaft coaxial with said second shaft and selectively coupled thereto by a first clutching means, a first pinion gear affixed to said third shaft, a fourth shaft, a gear train meshing with the internal gear teeth of said ring gear operative to drive said fourth shaft so as to rotate said fourth shaft in the opposite sense to said power actuated shaft, a fifth shaft coaxial with said fourth shaft and selectively coupled thereto by a second clutching means, a second pinion gear affixed to said fifth shaft, a sixth shaft having a gear affixed thereto meshing with both said first pinion gear and said second pinion gear.

3. A variable speed transmission mechanism comprising: a power actuated shaft, a ring gear affixed to said shaft and having gear teeth on both the inner and outer surfaces thereof, a second shaft, a gear train meshing with the gear teeth on the outer surface of said ring gear operative to drive said second shaft so as to rotate said second shaft in the same sense as said power actuated shaft, a third shaft coaxial with said second shaft and selectively coupled thereto by a first clutching means, a first pinion gear affixed to said third shaft, a fourth shaft, a gear train meshing with the internal gear teeth of said ring gear operative to drive said fourth shaft so as to rotate said fourth shaft in the opposite sense to said power actuated shaft, a fifth shaft coaxial with said fourth shaft and selectively coupled thereto by a second clutching means, a second pinion gear affixed to said fifth shaft, a sixth shaft having a gear affixed thereto meshing with both said first pinion gear and said second pinion gear, said first clutch means and said second clutch means being engaged in alternation.

4. A variable speed transmission mechanism comprising: a power actuated shaft, a ring gear having external and internal teeth thereon, second and third shafts having gears affixed thereto respectively engaging said external and internal teeth so as to have opposite senses of rotation when driven by said ring gear, fourth and fifth cylindrical shafts coaxial with said second and third shafts respectively and having pinion gears affixed thereto, means coupling said fourth and fifth shafts to said second and third shafts respectively in alternation, an output shaft having a gear affixed thereto simultaneously engaging said pinion gears affixed to said fourth and fifth shafts.

5. A variable speed transmission mechanism comprising: a power actuated shaft, a ring gear having external and internal teeth thereon, second and third shafts having gears affixed thereto respectively engaging said external and internal teeth so as to have opposite senses of rotation when driven by said ring gear, fourth and fifth cylindrical shafts coaxial with said second and third shafts respectively and having pinion gears affixed thereto, means selectively coupling said fourth and fifth shafts to said second and third shafts respectively, an output shaft having a gear affixed thereto simultaneously engaging said pinion gears affixed to said fourth and fifth shafts.

No references cited.